(No Model.)
F. W. SCHROEDER.
LOCK WASHER.
No. 497,348.  Patented May 16, 1893.
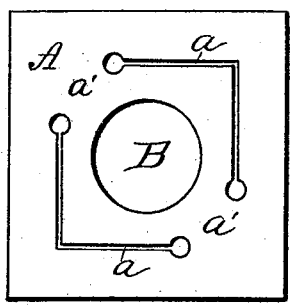
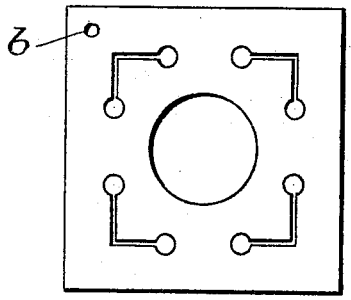
Attest
Waller Donaldson
James McShea
Inventor
F. W. Schroeder
by Richards & Co.
Att'ys
THE NORRIS PETERS CO., PHOTO-LITHO., WASHINGTON, D. C.

UNITED STATES PATENT OFFICE.

FREDERICK W. SCHROEDER, OF NEWTOWN, NEW SOUTH WALES, ASSIGNOR TO THE ECLIPSE PATENT NUT-LOCK WASHER COMPANY, LIMITED, OF SAME PLACE.

LOCK-WASHER.

SPECIFICATION forming part of Letters Patent No. 497,348, dated May 16, 1893.

Application filed February 26, 1892. Serial No. 422,990. (No model.)

*To all whom it may concern:*

Be it known that I, FREDERICK WILLIAM SCHROEDER, mechanical engineer, a subject of the Queen of Great Britain, residing at Newtown, near Sydney, in the British Colony of New South Wales, have invented a new and useful Lock-Washer, entitled "An Improved Nut-Lock Washer," of which the following is a specification.

This invention relates to a washer for use under the nut of bolts or under the head of screws or screw-bolts which washer will prevent the oscillation or vibration or other influences on the bolt or screw from loosening or unfastening the nut or screw.

This invention has been devised in order to provide a washer or plate which being easily and conveniently stamped or cut out in certain peculiar fashions will of itself form an effective and efficient lock on the nut or on the head of the screw or bolt.

In the drawings, Figure 1, is a plan view of one form of my nut lock washer and Fig. 2, is a similar view of another form.

In Fig. 1, the washer consists of a plate A, of rectangular form having a central opening B, for the bolt and two right angular slits $a$, at its diagonally opposite corners. These slits are of such length as to practically surround the bolt opening small intact portions $a'$ being between the ends of the slits. In Fig. 2, the slits are shorter but instead of two as previously described there are four in the present case one at each corner. These washers when on the bolt are held from turning either by their edges finding a bearing against the flange of the rail or other part to which the bolt is applied or as shown in Fig. 2, they may be perforated as at $b$, to receive a holding screw or pin.

Any method or manner of manufacturing this improved washer might be utilized but it is preferred that they should be made by one movement of a press which carrying a die and a matrix would out of bar or plate iron or other metal punch the bolt hole and make the necessary orifice or slits or cuts.

In use it is only necessary to prevent the washer from turning by any of the methods mentioned and to screw up the nut or the bolt so tightly that the nut or the head will be "square on" to the slits when a chisel or wedge or other article will lift the outer part of the plate or washer so as to take round or embrace two or more of the faces or sides of said nut or head.

Having now particularly described and explained the nature of my said invention and in what manner the same is to be performed, I declare that what I claim is—

A nut lock consisting of a rectangular plate having the opening for the bolt and the right angular slits at its diagonally opposite corners, extending parallel with the edges of the plate and approximately surrounding the bolt opening said slits being separated by intact portions, substantially as described.

FREDERICK W. SCHROEDER.

Witnesses:
   FRED WALSH,
      *Fel. Aust. Inst. P. A., Sydney.*
   THOMAS JAMES WARD,
      *Clerk to Edward Waters, Sydney.*